_United States Patent_ [19]

Kreps

[11] 4,335,850
[45] Jun. 22, 1982

[54] HOT WATER HEATING SYSTEM

[76] Inventor: Ralph L. Kreps, 12134 McKaig Rd., Hanoverton, Ohio 44423

[21] Appl. No.: 159,678

[22] Filed: Jun. 16, 1980

[51] Int. Cl.³ .................................................. F24B 7/00
[52] U.S. Cl. ................................... 237/54; 122/20 B; 237/8 R; 237/19
[58] Field of Search ...................... 237/50, 54, 55, 56, 237/8 R, 19; 126/132, 133; 122/20 B

[56] References Cited

U.S. PATENT DOCUMENTS

| | | | |
|---|---|---|---|
| 2,143,287 | 1/1939 | Smith | 257/248 |
| 2,554,338 | 5/1951 | Levine | 122/20 B |
| 3,295,503 | 1/1967 | Ranebo | 122/20 B |
| 3,896,992 | 7/1975 | Borovina et al. | 237/19 |
| 3,999,709 | 12/1976 | Estabrook | 237/19 |
| 4,043,014 | 8/1977 | Wilson | 122/20 B |
| 4,066,210 | 1/1978 | Pemberton et al. | 237/53 |
| 4,122,801 | 10/1978 | Burns | 122/20 B |
| 4,136,731 | 1/1979 | De Boer | 237/8 R |
| 4,143,816 | 3/1979 | Shadeland | 237/8 R |

*Primary Examiner*—Ronald C. Capossela
*Attorney, Agent, or Firm*—Frease & Bishop

[57] ABSTRACT

A system for producing hot water for a residential dwelling by recovering heat from the hot combustion gases in the flue and chimney of the dwelling's heating system. The system uses the usual hot water tank and furnace of the dwelling without any substantial modifications thereto. The hot water tank is located in an upper floor of the dwelling and is connected to the furnace which is located on a lower level by a first section of pipe which extends from adjacent the water heater to the furnace flue within the chimney. A cold water supply is connected to the first section of pipe by a second section of pipe which also extends through a portion of the chimney and the furnace flue to recover heat from the hot combustion gases passing therethrough. The heated water in the sections of pipe flows into the hot water tank through the usual cold water inlet line for subsequent discharge from the tank throughout the house. The usual heating means of the hot water tank supplies any additional heat that may be required to heat the water in the tank to a preset temperature during the summer or during periods of lower furnace usage.

8 Claims, 6 Drawing Figures

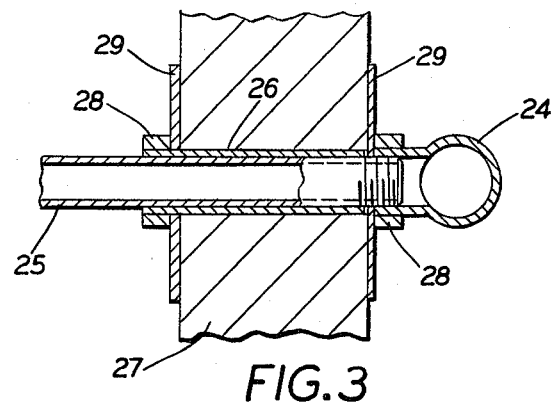
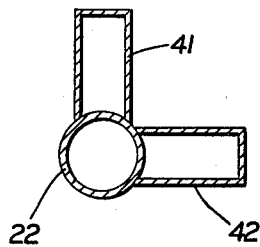
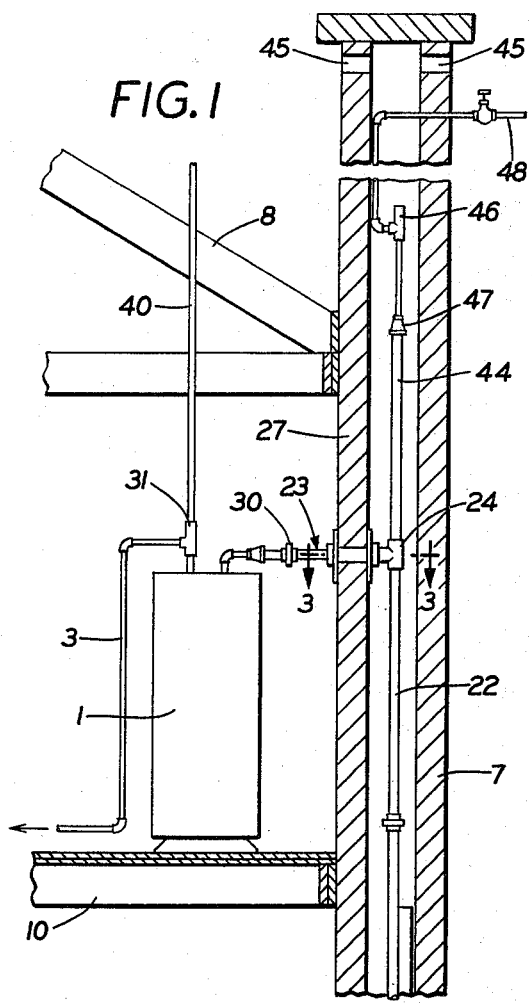
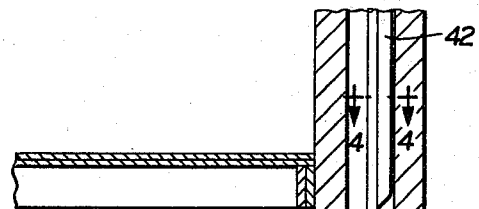
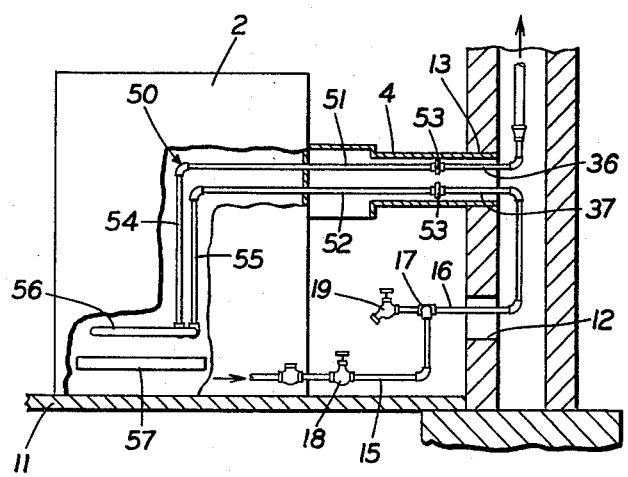
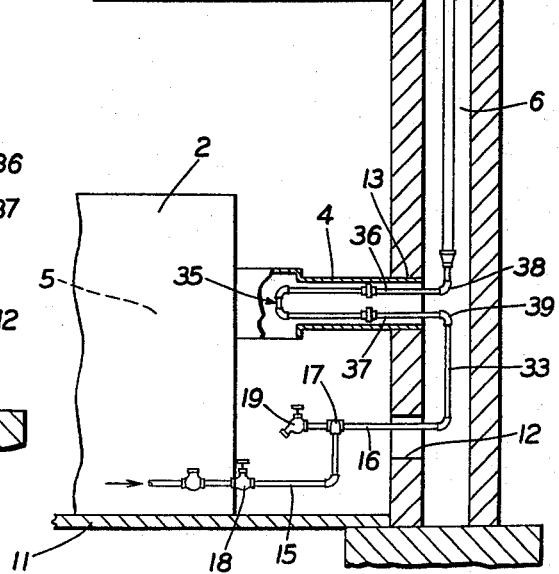

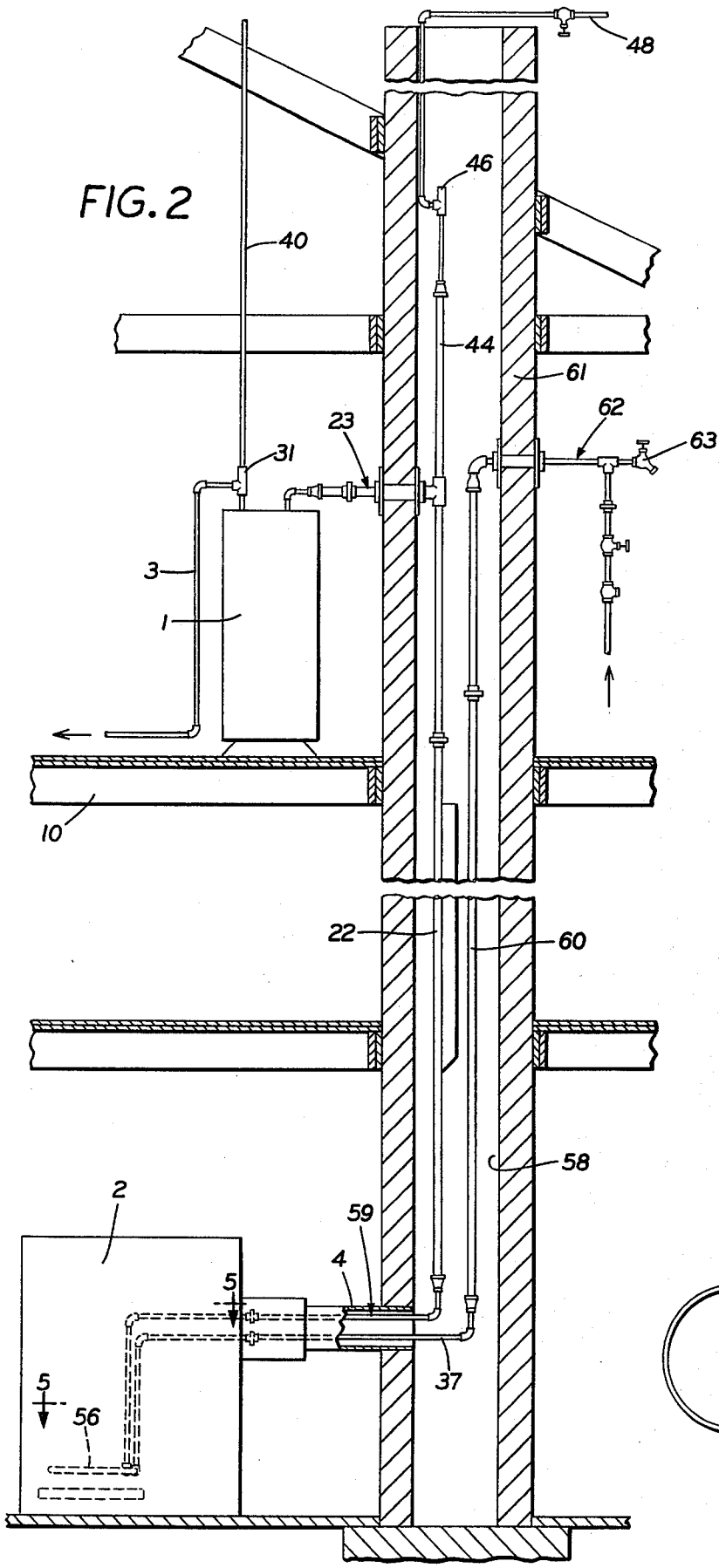

HOT WATER HEATING SYSTEM

BACKGROUND OF THE INVENTION

1. Field of the Invention

The invention relates to a system for heating hot water for home use, and in particular to a system which utilizes the hot gases of combustion from the furnace which are normally wasted through the furnace flue and chimney. More particularly the invention relates to an improved hot water heating system in which the usual domestic hot water heater is located on an upper floor of the house and is incorporated into the heating system to more efficiently recover the heretofore wasted heat of combustion.

2. Description of the Prior Art

Various hot water heating systems are known in the art which utilize the heat of the combustion gases escaping through the furnace flue and chimney to increase the efficiency of the water heating system. However, many of these prior art systems are relatively complicated and expensive in construction and are not as efficient or reliable in operation as that believed achieved by the present invention.

Many of the prior art heat recovery systems include devices which are incorporated only in the furnace flue pipe which connects the furnace to the chimney. Examples of such devices and systems are shown in U.S. Pat. Nos. 2,143,287, 3,896,992, 4,043,014, and 4,122,801. These devices provide only a relatively small surface area of the heat exchange tubes or members in which to collect the heat from the escaping gases due to their placement in the relatively short length of furnace flue pipe.

U.S. Pat. Nos. 3,295,503 and 4,066,210 show heat recovery systems in which the heat exchange unit or equipment is located in the chimney. The system shown in U.S. Pat. No. 3,295,503 includes a water jacket which surrounds an inner flue pipe, all of which is mounted in the chimney. This may result in an extremely expensive construction to fabricate and intall, and if the water jacket develops a leak it would be expensive to repair due to its location within the chimney and the difficulty of removing it therefrom. The system shown in U.S. Pat. No. 4,066,210 uses a coiled tube which is mounted in the chimney and requires the use of two separate water tanks which are mounted in the basement of the dwelling for operation of the heating system. Thus, these two systems are believed to be considerably more expensive and difficult to operate than the present invention.

SUMMARY OF THE INVENTION

Objectives of the present invention include providing a hot water heating system which can be incorporated into a new or existing residential-type dwelling without considerable expense and difficulty, and which enables the heat to be collected from the gases of combustion throughout the length of the flue pipe and also throughout a considerable length of the chimney, thereby increasing the heat recovery efficiency of the system; providing such an improved water heating system which uses the domestic hot water tank of the dwelling for collecting and distributing the hot water and in which the tank is located on an upper floor of the dwelling enabling a sufficient length of heat recovery pipe to extend throughout the chimney for heating the water prior to its entering the tank and to utilize the natural tendency of heated water to rise; providing such a system in which the hot water tank automatically supplies any additional heat required to raise the temperature of the water leaving the tank to the desired temperature regardless of the amount of heat being discharged through the furnace flue and chimney, thereby enabling the hot water tank to be used in its usual manner without any modifications during the summer or other periods when the furnace is not operating to provide hot water for the home; providing such an improved water heating system in which a portion of the heat recovery pipes may have a looped configuration which is located directly in the fire box or heating chamber of an oil or gas-fired furnace, thereby increasing still further the efficiency of the system; providing such an improved water heating system which can be intalled in existing chimneys whether or not the chimney has a clean-out opening in the bottom thereof; providing such an improved water heating system in which the heat recovery pipes are formed of inexpensive galvanized lengths of pipe connected together by usual couplings and elbows, thereby eliminating any expensive fabrication of water jackets, coiled tubings or the like as used in prior heat recovery systems, and in which the pipes can be installed in existing chimneys through the open chimney top with only one or two openings being required to be formed in the chimney for connecting the existing hot and cold water lines thereto; and providing an improved hot water heating systems which eliminates difficulties encountered with prior systems, achieves the stated objectives simply, effectively, efficiently and inexpensively and solves problems and obtains new results in the art.

These objectives and advantages are obtained by the improved hot water heating system, the general nature of which may be stated as including in combination with a home heating system and hot water tank which includes a furnace having a fuel combustion chamber, a chimney, a flue pipe extending between the combustion chamber and chimney to carry off hot gases of combustion from the combustion chamber and into the chimney for discharge to the surrounding atmosphere, and in which the hot water tank is located in the home at least a floor above the location of the furnace and includes a cold water inlet suply line and a hot water outlet line; a first section of pipe connected to the water tank inlet line and extending downwardly within the chimney to a position adjacent the flue pipe; a second section of pipe connected to a supply of cold water and extending to a position adjacent the flue pipe; and a third section of pipe located within the flue pipe and connected to the first and second sections of pipe whereby cold water from the cold water supply flows through the second section of pipe and into and through the third section of pipe and then upwardly in the chimney through the first section of pipe and into the water tank for subsequent discharge therefrom with the water being heated by the hot gases flowing through the flue pipe and chimney.

BRIEF DESCRIPTION OF THE DRAWINGS

Preferred embodiments of the invention—illustrative of the best mode in which applicant has contemplated applying the principles—are set forth in the following description and shown in the accompanying drawings, and are particularly and distinctly pointed out and set forth in the appended claims.

FIG. 1 is a fragmentary, diagrammatic view, portions of which are broken away and in section, showing the improved water heating system;

FIG. 2 is a fragmentary, diagrammatic view, portions of which are in section, similar to FIG. 1, showing a modified form of the improved water heating system;

FIG. 3 is an enlarged fragmentary sectional view taken on line 3—3, FIG. 1;

FIG. 4 is an enlarged sectional view taken on line 4—4, FIG. 1;

FIG. 5 is an enlarged sectional view taken on line 5—5, FIG. 2; and

FIG. 6 is a fragmentary, diagrammatic view, portions of which are broken away and in section, showing the mounting of the looped pipe section of FIG. 5 in the embodiment of FIG. 1.

Similar numerals refer to similar parts throughout the drawings.

DESCRIPTION OF THE PREFERRED EMBODIMENTS

First Embodiment

The first embodiment of the improved hot water system is shown diagrammatically in FIG. 1. The improved system is adapted to be used in conjunction with a usual residential-type hot water tank 1 and a furnace 2. Water tank 1 preferably is of the electric or gas variety which is used for supplying the hot water requirements of the house through a main hot water discharge line 3. Furnace 2 may be of the usual gas or oil-fired type or can be a coal, wood or other solid fuel type of furnace.

A flue pipe 4 extends outwardly from the rear of furnace 2 and provides communication between a fuel combustion chamber 5 located within the furnace and the hollow interior 6 of a chimney 7. Chimney 7 will extend throughout the vertical height of the house, terminating at some point above roof 8 on the exterior of the house.

In accordance with one of the features of the invention, water tank 1 is placed on an upper floor 10. Floor 10 preferably is the attic of the house with furnace 2 being located at the basement level 11. The embodiment of FIG. 1 is intended primarily for use in those homes in which the chimney is formed with a clean-out opening 12 that is formed in the base of many chimneys 7 and located beneath a flue pipe receiving opening 13. A pipe 15 which is connected to a supply of cold water, such as the municipal water system or home well, is connected to another section of pipe 16 by a T-connector 17. Pipe 16 extends through clean-out opening 12 into chimney interior 6. A usual shut-off valve 18 preferably is located in pipe 15 and pipe 16 may terminate in a usual spigot 19 to provide a source of cold water in the basement.

In accordance with another feature of the invention, a first section of pipe 22 communicates with a hot water tank inlet line, which is indicated generally at 23, by a T-connector 24. The water tank inlet line 23 is shown in detail in FIG. 3 and includes a short section of pipe 25 which extends through the interior of a larger pipe 26 which forms the opening through the interior wall 27 of chimney 7. A pair of nuts 28 secure pipe 26 and T-connector 24 in position, as shown in FIGS. 1 and 3. A pair of steel plates 29 are clamped against chimney wall 27 by nuts 28 to ensure a strong rigid mounting connection for tank inlet 23 and to assist the supporting of pipe section 22 within chimney interior 6. Tank inlet 23 is connected to tank 1 by a connctor 30. A usual hot water tank relief valve 31 is connected in the hot water discharge line 3 by a pipe 40 extending upwardly through the ceiling and roof to the exterior of the house.

A second section of pipe 33 is connected to cold water inlet pipe 16 and extends upwardly within chimney interior 6 terminating just below the bottom end of pipe section 22. A third section of pipe, indicated generally at 35, which has an elongated U-shaped configuration and is connected to pipes 36 and 37, is located within the flue pipe 4. Pipe section 35 extends into chimney interior 6 with pipes 36 and 37 being connected to the ends of pipe sections 22 and 33 by elbow joints 38 and 39, respectively.

A pair of U-shaped members 41 and 42 (FIGS. 1 and 4) are spot welded to a portion of pipe section 22 and extend longitudinally therealong to assist in bracing pipe section 22 within chimney interior 6. Members 41 and 42 also assist in capturing additional heat from the escaping gases of combustion to increase the efficiency of the water heating system.

A fourth section of pipe 44 is connected to the top of pipe section 22 by T-connector 24 and extends vertically upwardly therefrom within chimney interior 6 and terminates below the chimney top opening 45. A pressure relief valve 46 preferably is mounted on the upper end of pipe section 44 by a reducer 47. A pressure release discharge pipe 48 extends upwardly from relief valve 46 and extends through the wall of chimney 7 for discharge of water and steam to the outside upon the opening of relief valve 46.

The operation of the improved water heating system is set forth below with reference to FIG. 1. Cold water is drawn from a usual cold water supply through pipe 15 and flows through pipe 16 and then upwardly through pipe section 33 into and out of flue pipe 4 within pipe section 35 and then upwardly through pipe section 22 and into hot water tank 1 through tank inlet line 23. The temperature of the water which flows into pipe section 33 is increased considerably before it reaches tank 1 by the transfer of heat contained in the escaping gases of combustion which flow out of flue pipe 4 and upwardly through the chimney about pipe section 22 prior to the gases being discharged through chimney openings 45. Thus, depending upon the heat of the combustion gases, the temperature of the water entering tank 1 may not require additional heating from the usual heat source of tank 1 prior to its being discharged through line 3 when a hot water spigot is opened in the house.

It has been found that during the winter months when furnace 2 is operating continuously to supply heat to the home, almost no additional heat is required from the water tank heating source to heat the water to provide the hot water requirements of the household. Occasionally, the water in tank 1 will be heated to such an extent that relief valve 46 will open, enabling a combination of steam vapors and water to be discharged from pipe 48 to the exterior of the chimney to maintain the temperature of the water within tank 1 at the preset level. The location of the water delivery pipe in flue pipe 4 and in the chimney interior provides sufficient pipe area for collection of heat from the escaping gases to heat the water, especially due to the placement of tank 1, preferably in the attic above the furnace, which usually is located in the basement. Also, this arrangement of tank 1 and furnace 2 increases the efficiency of the system since the heated water will rise in pipe 22, enabling the cooler water to be heated more quickly within flue pipe 4 and the lower regions of chimney interior 6 where the combustion gases are the hottest.

FIG. 6 shows a somewhat modified form of the water heating system shown in FIG. 1, in which the efficiency of the system is increased by use of looped pipe extension 50 mounted on the end of the third pipe section 35. Extension 50 consists of a pair of horizontally extending pipes 51 and 52 which are connected by unions 53 to the inner ends of pipes 36 and 37 of pipe section 35. A pair of pipes 54 and 55 extend downwardly from the inner ends of pipes 51 and 52, respectively, and terminate in a loop 56 similar to that shown in FIG. 5. Pipe loop 56 is placed a short distance above the heat source 57 of furnace 2, such as the burners of a gas or oil-fired furnace. Thus, the incoming cold water will flow completely into and through the combustion chamber of furnace 2 and around loop 56 before flowing upwardly through pipe section 22 and into water tank 1, increasing still further the amount of heat absorbed by the flowing water.

Second Embodiment

A modified form of the invention is shown in FIG. 2 in which the improved water hating system is combined with the furnace and hot water tank of a house, in which the chimney does not have a bottom clean-out opening similar to opening 12 of FIG. 1, and in which the connection to the cold water supply is at the same or approximate floor level location as is the hot water tank.

The embodiment of FIG. 2 is similar to that of FIG. 1 in that the first pipe section 22 is connected to tank 1 by inlet line 23 and is connected to a third pipe section 59 which is located within flue pipe 4. This second embodiment is shown with looped pipe extension 56 mounted within the combustion chamber of furnace 2, similar to the configuration shown in FIG. 6 of the first embodiment.

In this second embodiment, the second pipe section, indicated at 60, which performs a similar function as pipe section 33 of the first embodiment, extends vertically in chimney interior 58 from adjacent flue pipe 4 upwardly to a position generally adjacent water tank inlet line 23. Pipe section 60 is connected at its lower end to pipe 37 and at its upper end to a cold water inlet line 62 which extends through chimney wall 61 in the same manner as discussed above with respect to inlet line 23 and as shown in FIG. 3. A spigot 63 also may be connected to cold water supply inlet pipe 62.

The operation of the second embodiment of FIG. 2 is generally similar to that described for the embodiment of FIG. 1 except that the incoming cold water enters chimney interior 58 and flows downwardly through pipe section 60 and then into and out of flue pipe 4. The partially heated water then will flow either through loop extension 56 or through a U-shaped third pipe section similar to pipe section 35 as shown in FIG. 3. Thus, the water is heated as it travels downwardly through pipe 60, into and out of furnace 2 and flue pipe 4, and then upwardly within pipe 22 before flowing into tank 1 for subsequent storage and distribution throughout the house.

Fourth pipe section 44 and relief pressure valve 46 also communicate with the top of first pipe section 22, with pressure relief discharge pipe 48 being shown extending outwardly through the open top of the chimney instead of exiting through a secondary opening, as in FIG. 1. The remaining construction and features of this second embodiment are similar to that of the first embodiment, and therefore are not described in detail.

IN GENERAL

The particular pipe diameters and lengths may vary without affecting the concept of the invention and can be adapted to meet the particular household requirements in which they are installed and are determined by the size of hot water tank 1, heating capacity of furnace 2, and the average water pressure of the incoming water supply. For example, pipe sections 22 may be between one and two inch diameter pipes, and pipe sections 35 and 59 may be between one-half and three-quarter inch diameter pipes. The improved hot water heating system works on the principle of a heat exchange unit, and it uses the heat from a furnace that is usually wasted as its primary heat source, thereby having no energy costs for its operation.

The improved system can be used for five or six months throughout the year for producing all of the hot water requirements of a household without any energy costs. Furthermore, when the furnace is turned off during the summer or operating part time during the fall or spring months, the electric or gas fuel supply of the hot water tank will automatically make up any additional heat required to heat the water to the preset temperature. The energy source of the hot water tank usually is constrolled by the setting of the tank's thermostat and will apply heat to the water contained therein only when the temperature of the water is below the preset value.

Thus, the improved hot water heating system provides a system which is incorporated easily into an existing or new house since the main supply pipe sections can be placed in the chimney through the chimney top opening and flue pipe opening with the connections being made through the existing flue pipe opening and clean-out door opening. Also, the system requires only a single new hole to be formed in the chimney wall for connecting tank inlet line 23 to pipe section 22 in the first embodiment of FIG. 1, and requires only two holes to be formed in the chimney wall for the incoming cold water supply line and water tank connection line in the embodiment of FIG. 2. Another advantage of the improved water heating system is the relatively low cost of the pipes which are used in the system. The pipes preferably are formed of galvanized steel and use industry standard type unions, connections and elbow joints for their installation, thereby eliminating any special manufacturing or fabricating operations or components. Furthermore, such pipes are extremely durable and rugged in use and eliminate nearly all maintenance and have a long life before replacement is necessary.

Accordingly, the improved hot water heating system is simplified, provides an effective, safe, inexpensive, and efficient arrangement which achieves all the enumerated objectives, provides for eliminating difficulties encountered with prior water heating systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved hot water heating system is constructed and used, the characteristics of the system, and the advantageous, new and useful results obtained; the new and useful structures, devices, elements, arrangements, parts, and combinations, are set forth in the appended claims.

I claim:

1. In combination with a home heating system and a single hot water tank which includes a furnace having a fuel combination chamber, a chimney, a flue pipe extending between the combustion chamber and chimney to carry off hot gases of combustion from the combustion chamber and into the chimney for discharge to the surrounding atmosphere, and in which the hot water tank is located in the home at least a floor above the location of the furnace and includes a cold water inlet supply line and a hot water outlet line; a first linear section of pipe connected to the water tank inlet line and extending downwardly within the chimney to a position adjacent the flue pipe; a second section of pipe connected to a supply of cold water and extending to a position adjacent the flue pipe; and a third section of pipe located within the flue pipe and extending into the fuel combustion chamber of the furnace and connected to the first and second sections of pipe whereby cold water from the cold water supply flows through the second section of pipe and into and through the third section of pipe and then upwardly in the chimney through the first section of pipe and into the water tank for subsequent discharge therefrom with the water being heated by the combustion of fuel within the fuel combustion chamber of the furnace and by the hot gases flowing through the flue pipe and chimney.

2. In a system defined in claim 1 in which a chimney clean out opening is provided in the chimney beneath the flue pipe; and in which the second section of pipe is connected to the cold water supply through said clean out opening and extends upwardly in the chimney from said clean out opening to adjacent the flue pipe.

3. In a system defined in claim 1 in which a fourth section of pipe is operatively connected to the first section of pipe at the junction with the water tank inlet line; and in which the fourth section of pipe extends upwardly in the chimney and terminates in an outlet opening which is located exteriorly of the chimney to provide a pressure relief outlet for the water tank.

4. In a system defined in claim 3 in which a pressure relief valve is connected in the fourth section of pipe.

5. In a system defined in claim 1 in which the second section of pipe extends upwardly within the chimney from its connection with the third section of pipe adjacent the flue pipe and is connected with the cold water supply at a location generally at the same floor level as the water tank.

6. In a system defined in claim 1 in which the first, second and third sections of pipe are formed of galvanized steel.

7. In a system defined in claim 1 in which U-shaped members are attached to the first section of pipe and extend longitudinally along a portion of said first section.

8. In a system defined in claim 1 in which the portion of the third section of pipe which extends into the fuel combustion chamber of the furnace includes a looped end portion.

* * * * *

UNITED STATES PATENT AND TRADEMARK OFFICE
CERTIFICATE OF CORRECTION

PATENT NO. : 4,335,850
DATED : June 22, 1982
INVENTOR(S) : Ralph L. Kreps

It is certified that error appears in the above-identified patent and that said Letters Patent are hereby corrected as shown below:

Column 1, line 41, change "intall" to -install-

Column 2, line 16, change "intalled" to -installed-

Column 2, line 30, change "systems" to -system-

Column 2, line 46, change "suply" to -supply-

Column 5, line 25, change "hating" to -heating-

Column 7, line 14, change "combination" to -combustion-

Signed and Sealed this

Nineteenth Day of October 1982

[SEAL]

Attest:

GERALD J. MOSSINGHOFF

Attesting Officer

Commissioner of Patents and Trademarks